US007657589B2

(12) United States Patent
Verma

(10) Patent No.: US 7,657,589 B2
(45) Date of Patent: Feb. 2, 2010

(54) SYSTEM AND METHOD FOR GENERATING A FIXED POINT APPROXIMATION TO NONLINEAR FUNCTIONS

(75) Inventor: Tony S. Verma, San Francisco, CA (US)

(73) Assignee: Maxim Integrated Products, Sunnyvale, CA (US)

( * ) Notice: Subject to any disclaimer, the term of this patent is extended or adjusted under 35 U.S.C. 154(b) by 933 days.

(21) Appl. No.: 11/207,024

(22) Filed: Aug. 17, 2005

(65) Prior Publication Data

US 2007/0043799 A1    Feb. 22, 2007

(51) Int. Cl.
*G06F 7/38* (2006.01)
(52) U.S. Cl. .................................. 708/605; 708/606
(58) Field of Classification Search ......... 708/605–606, 708/500, 277
See application file for complete search history.

(56) References Cited

U.S. PATENT DOCUMENTS

| 4,905,177 A | * | 2/1990 | Weaver et al. ............... 708/276 |
| 5,179,659 A | * | 1/1993 | Lien et al. .................... 708/650 |
| 7,191,204 B1 | * | 3/2007 | Ogata ........................... 708/605 |

* cited by examiner

*Primary Examiner*—Tan V Mai
(74) *Attorney, Agent, or Firm*—Christopher P. Maiorana, PC

(57) ABSTRACT

A system and method are provided for use in an electronic device configured to process data to perform a method of generating a fixed point approximation of a number x by first locating the most significant bit of a given number, then retrieving predetermined values from electronic data storage, where the first value is based on a first index value generated from the most significant bit and contains fixed-point representation located in a table in storage. Then, output values are generated from look-up tables that correspond to index values generated from a number of bits that immediately following the most significant bit. Finally, the final mathematic result is computed using fixed-point arithmetic logic to generate a fixed point approximation.

14 Claims, 3 Drawing Sheets

Memory/Storage 130

MSB Table 132

| Index | Value "$V_1$" |
|---|---|
| $I_{21}$ | Value - $I_{11}$ |
| $I_{22}$ | Value - $I_{12}$ |
| ⋮ | ⋮ |
| $I_{2n}$ | Value - $I_{1n}$ |

Second Values Table 148

| Index | Value "$V_2$" | Value "$V_3$" |
|---|---|---|
| $I_{21}$ | $I_{21}$-a | $I_{21}$-b |
| $I_{22}$ | $I_{22}$-a | $I_{22}$-b |
| ⋮ | ⋮ | ⋮ |
| $I_{2n}$ | $I_{2n}$-a | $I_{2n}$-b |

FIG. 1B

SYSTEM AND METHOD FOR GENERATING A FIXED POINT APPROXIMATION TO NONLINEAR FUNCTIONS

BACKGROUND

The invention relates to using electronic devices such as computers to solve a class of nonlinear functions, specifically power functions, such as $x^{4/3}$, $x^{0.76312}$, $x^{-1/2}$ and similar functions. More specifically, the invention addresses the case where both the input and output are fixed-point numbers represented in binary format, such as is used in computers and other electronic devices.

Electronic devices such as computers require complex mathematical computations to be performed in order to operate. For example, in a video signal processor, color, contrast and other characteristics that need to be projected or otherwise presented in visual media are quantified in numerical values. Mathematical operations are then performed on these values to enable a device such as a television to operate. These operations need to be finite by their nature so that the device can operate, thus they must be approximated. The performance of a device depends on its ability to efficiently approximate results to data processing equations. One such operation is the approximation of a fixed point number raised to a power. There are a number of conventional techniques that address the problem of generating a fixed point approximation to power functions using electronic hardware and software, particularly in video or audio applications, where voluminous amounts of data needs to constantly and accurately be processes. Even more particularly, high definition media processors require an enormous amount of data processing to enable quality media presentations. Some methods of approximating a power functions include Taylor series approximation, Newton-Raphson method or table lookup. Each of these methods has tradeoffs between complexity in terms of memory or operations, restrictions on the domain and or range of the function to be approximated, and accuracy of the result. For example, a Taylor series is appropriate only if the expansion is around a convenient number and all input values, known in the art as the domain, are close to that number. Otherwise the accuracy suffers. Newton-Raphson is limited because of the processing power required to produce a result. For example, the Newton-Raphson method may operate adequately in some applications for finding the square root of a number, but would not work well for generating the results for the 4/3 or 3/4 powers because of complexity in terms of operations. The memory required for a table lookup is proportional to the domain of the function. Thus, if an application needs a great deal of data, such as audio or video data, a great deal of storage space would be needed to store such tables, and the database operations would further slow down the processing.

The problem with conventional techniques is that there is a good deal of complexity, which translates into a need for a large amount of memory space and a large number of operations to be performed. Limiting these factors correlates to a limit in the domain of possible variables and results. Conventional methods also provide only limited accuracy when approximating power functions using fixed-point arithmetic. Most systems and methods simply use a complex set of lookup tables, or rely on Taylor series approximations that require a relatively large number of mathematical calculations, such as adds and multiplies.

Therefore, there exists a need many fields for an accurate system and method for generating a fixed point approximation that is not burdensome on a processor or on memory of a given device. As will be seen the invention accomplishes this in an elegant manner.

BRIEF DESCRIPTION OF THE DRAWINGS

FIG. 1B is a diagrammatic view of a memory storage for use by the host signal processor of FIG. 1.

DETAILED DESCRIPTION

Figure 1A:
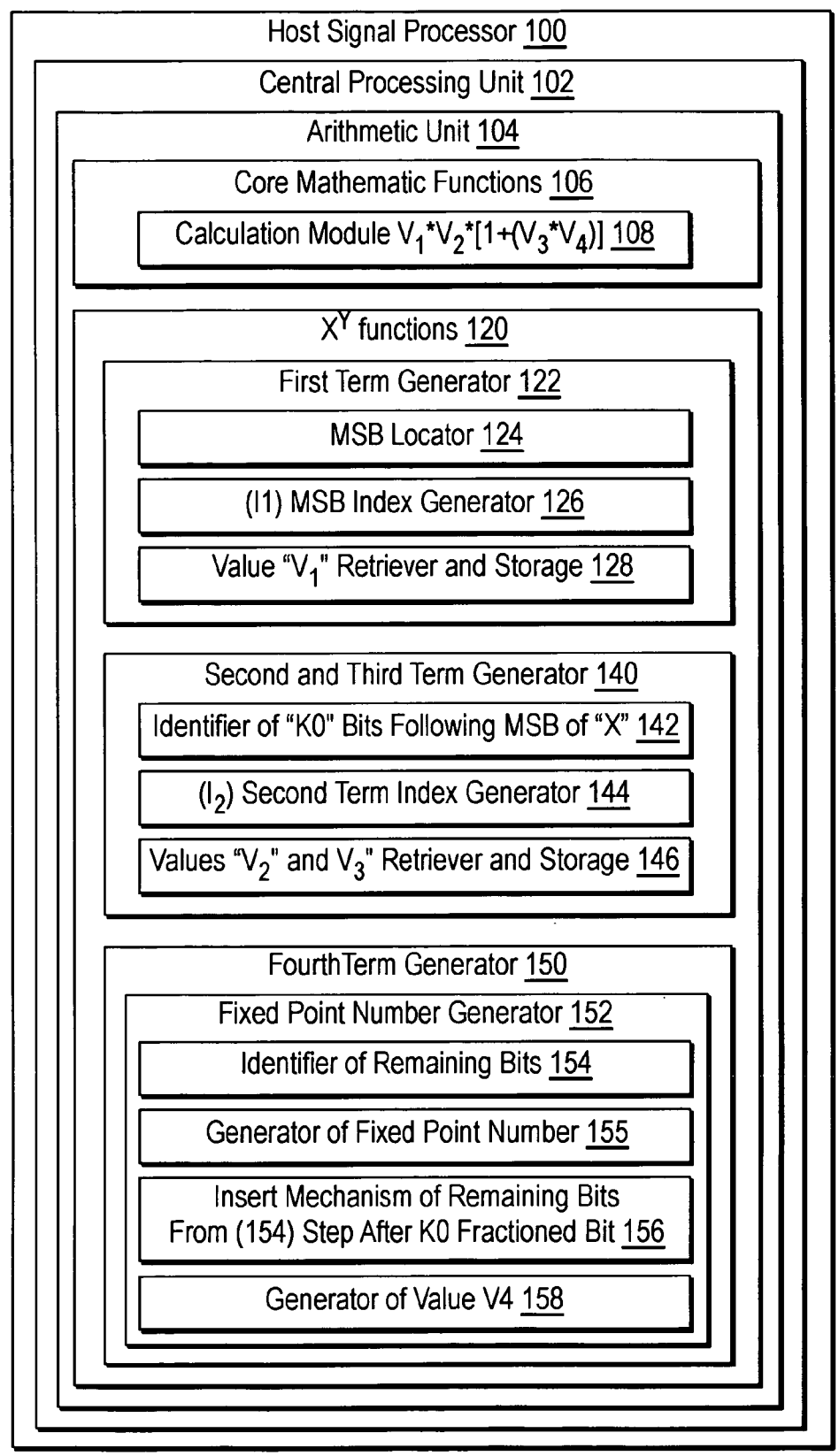
FIG. 1A is a diagrammatic view of a host signal processor configured according to the invention.

The invention is directed to a system and method for performing power functions that allows for a large domain and provides reasonable accuracy for approximating power functions using fixed-point arithmetic. The invention provides a novel combination of a table lookup combined with Taylor series approximation that uses relatively small tables and a handful of adds and multiplies. The invention improves performance of electronic devices that require the computation of nonlinear functions by greatly streamlining necessary calculations. Examples include portable music devices that use CODECs that require nonlinear quantization in both the recording and playback of audio, 3-D graphic devices which rely heavily on the inversion (i.e., $x^{\wedge}(-1)$) data for rendering, and other applications where expedient computations improve performance.

More particularly, the invention is directed to a system and method of generating a fixed point approximation for a powers function. First, the novel method is configured to determine a value, denoted N, of the most significant bit in x to serve as an index into a table that contains fixed-point representations of $x^{(N-fractional\_bits)y}$. The retrieved value is denoted as $v_1$, and storing the value. Then, an index is generated, denoted M, from a predetermined number of bits following the most significant bit, such as the $k_o$ bits immediately following the most significant bit. M is used as an index to address a second table that contains two output values per table entry. In the tables, values are pre-calculated to save memory space and processing time, including the following values:

$$v_2 = (1 + a_1 2^{-1} + a_2 2^{-2} + \ldots + a_{k_o} 2^{-k_o})^y; \text{ and}$$

$$v_3 = y/(1 + a_1 2^{-1} + \ldots + a_{k_o} 2^{-k_o}).$$

These values are then stored for later incorporation into the final formula. Then the process calls for creating a fixed-point number from remaining bits of x, if any exist, that directly follow the index M bits. These remaining bits are then inserted into the created number starting at the $k_o+1$ fractional-bit to get a result. Here, both the integer-bits and the first $k_o$ fractional-bits of the result are all zero, and wherein the remaining bits of the result are the remaining bits of x to generate a second result, $v_4$. The second result is then stored. The final result is then computed from the formula $x^y \approx v_1 \times v_2 \times [1 + (v_3 \times v_4)]$ using fixed-point arithmetic to generate a fixed point approximation.

Below is a mathematical expression of an embodiment of the invention. The value "x" is a fixed-point number, which may be expressed in binary as:

$$x = 2^N + a_1 2^{N-1} + a_2 2^{N-2} + \ldots + a_k 2^{N-k} = 2^N(1 + a_1 2^{-1} + a_2 2^{-2} + \ldots + a_k 2^{-k})$$

In the case of the general power function $x^y$:

$$x^y = [2^N(1 + a_1 2^{-1} + \ldots + a_{k_o} 2^{-k_o} + a_{k_o+1} 2^{-(k_o+1)} + \ldots + a_k 2^{-k})]^y =$$
$$\left[2^N(1 + a_1 2^{-1} + a_2 2^{-2} + \ldots + a_{k_o} 2^{-k_o})\left(1 + \frac{a_{k_o+1} 2^{-(k_o+1)} + a_{k_o+2} 2^{-(k_o+2)} + \ldots + a_k 2^{-k}}{1 + a_1 2^{-1} + a_2 2^{-2} + \ldots + a_{k_o} 2^{-k_o}}\right)\right]^y =$$
$$(2^N)^y (1 + a_1 2^{-1} + a_2 2^{-2} + \ldots + a_{k_o} 2^{-k_o})^y \left(1 + \frac{a_{k_o+1} 2^{-(k_o+1)} + a_{k_o+2} 2^{-(k_o+2)} + \ldots + a_k 2^{-k}}{1 + a_1 2^{-1} + a_2 2^{-2} + \ldots + a_{k_o} 2^{-k_o}}\right)^y \quad (1)$$

The first two bracketed terms here have the following properties. The value N in the first term is the position of the most significant bit. The first term is therefore found via table lookup according to value of N. The number of entries in the table corresponds to the number of bits the input has (e.g., if the input is 20 bits, the table has 20 entries). While N provides the index into the table, the table entries are pre-computed values of $(2^N)^y$. The bit-width of each table entry depends on the desired accuracy. The second term is simply a lookup into a $k_o$-bit table ($2^{k_o}$ entries). An index is formed directly from the $k_o$ coefficients and the $(1+a_1 2^{-1}+a_2 2^{-2}+ \ldots +a_{k_o} 2^{-k_o})^y$ values are stored in the table.

According to the invention, the third term in Equation (1) is forced into a form amenable to Taylor series expansion. Those skilled in the art understand that a Taylor series works well only in a finite interval around a defined point, such as $x^y$ for example, where $0.9 \leq x \leq 1.1$. The general case of $x^y$ does not meet this criteria. However, it has been discovered that the third term in Equation (1), $$\left(1 + \frac{a_{k_o+1} 2^{-(k_o+1)} + a_{k_o+2} 2^{-(k_o+2)} + \ldots + a_k 2^{-k}}{1 + a_2 2^{-1} + a_2 2^{-2} + \ldots + a_{k_o} 2^{-k_o}}\right)$$

is guaranteed to be close to 1. It has been further observed that this makes the entire third term ideal for a Taylor series expansion. Consider the first order Taylor series expansion about the value 1:

$$f(z) \cong f(1) + f'(1)(z-1)$$

In terms of what the third term in (1) is, where z is close to 1:

$$(z)^y = \left(1 + \frac{a_{k_o+1} 2^{-(k_o+1)} + a_{k_o+2} 2^{-(k_o+2)} + \ldots + a_k 2^{-k}}{1 + a_1 2^{-1} + a_2 2^{-2} + \ldots + a_{k_o} 2^{-k_o}}\right)^y$$
$$\cong 1 + y\left(\frac{a_{k_o+1} 2^{-(k_o+1)} + a_{k_o+2} 2^{-(k_o+2)} + \ldots + a_k 2^{-k_o}}{1 + a_1 2^{-1} + a_2 2^{-2} + \ldots + a_{k_o} 2^{-k_o}}\right)$$
$$= 1 + \left(\frac{y}{1 + a_1 2^{-1} + a_2 2^{-2} + \ldots + a_{k_o} 2^{-k_o}}\right)(a_{k_o+1} 2^{-(k_o+1)} + a_{k_o+2} 2^{-(k_o+2)} + \ldots + a_k 2^{-k})$$

Plugging this back into Equation (1) gives Equation (2) as follows:

$$x^y = (2^N)^y (1 + a_1 2^{-1} + \ldots + a_{k_o} 2^{-k_o})^y \left(1 + \left(\frac{y}{1 + a_1 2^{-1} + \ldots + a_{k_o} 2^{-k_o}}\right)(a_{k_o+1} 2^{-(k_o+1)} + \ldots + a_k 2^{-k})\right)$$

While this appears to look complicated, it's greatly simplified. According to a system embodying the invention, the operation of this equation can be accomplished using two index generation operations, two table lookup operations, three multiplication operations and one add operation. Defining the first term requires finding the position of the most significant bit then a table lookup. The second term is simply a lookup into a $k_o$-bit table. An index is formed directly from the $k_o$ coefficients and the $(1+a_1 2^{-1}+a_2 2^{-2}+ \ldots +a_{k_o} 2^{-k_o})^y$ values are stored in the table. The table has an additional output, $y/(1+a_1 2^{-1}+ \ldots +a_{k_o} 2^{-k_o})$, used for the third term. The third term uses the table lookup from the second term, multiplies it with what is essentially an index (specifically, the remaining the bits of the input shifted appropriately so that the multiply makes sense for the given number format) and adds 1 to the result.

In the final operation, the terms are multiplied together, and the output result is generated. The error bound here is also possible to compute. In one method, determining the error bounds requires looking at the Lagrange Remainder Formula for the Taylor series as well as what happens with the first two terms.

Referring to FIG. 1a, a host signal processor 100 embodying the invention is illustrated. The processor 100 includes a central processing unit 102 that conventionally is used to perform data processing functions for a processor, and further includes an arithmetic unit 104 that is conventionally is used perform the arithmetic operations, such as add, multiply, etc., for the central processing unit. The core mathematical functions unit 106 is configured to perform conventional calculations, and is further configured with a calculation module 108 to perform the operation: $x^y = v_1 * v_2 * \{1 + (v_3 * v_4)\}$, according to the invention. The arithmetic unit is further configured with function module 120 configured to perform $x^y$ related functions, and for generating and gathering values used to perform the operation $x^y=v_1*v_2*\{1+(v_3*v_4)\}$. Each of these will be discussed separately.

The functions module 120 includes a first term generator 122 configured to generate the first term $v_1$ of the equation. The first term generator includes a MSB locator 124 configured to locate the most significant bit of the number "x". Those skilled in the art will understand that MSB location operations can be performed using common software processing techniques, where the MSB is determined as the leftmost binary position with a non-zero value, which is true for x as an unsigned or positive integer. The invention is not limited to any particular technique. The first term generator further includes a MSB index generator 126 configured to generate an index value, $I_1$, that is used to retrieve a value in a look-up table. The value "$v_1$" retriever and storage module 128 is configured to retrieve the value of $v_1$ from a look-up table.

Referring to FIG. 1b, a memory/storage device 130 is illustrated such a lookup table. The MSB Table 132 is used to store the values associated with the MSB index value, $I_{11}$, $I_{12}$, ... $I_{1n}$, which correspond to the first index value $I_1$ discussed above. These MSB index values correspond to the values in the column located to the right of the list of index values that set forth Value-$I_{11}$, Value-$I_{12}$, ..., Value-$I_{1n}$ respectively. The double subscripted values are used to illustrate that the index values are different, and may be sequential. The double subscript notation is intended further to distinguish the first index values from the second index values that correspond with the Second, third and fourth terms discussed below. Referring again to FIG. 1a, the retriever and storage module 128 is further configured to store the value $v_1$ for subsequent calculations.

The functions module 120 further includes a second and third term generator 140 configured to generate the terms $v_2$ and $v_3$ respectively. The second term generator includes an identifier module 142 configured to identify the $k_0$ bits, a predetermined and finite number of bits that contribute to define the value of x. More particularly, the $k_0$ bits define a number of bits that follow the most significant bit of the number x. Once identified, the second term index generator 144 generates a second index value $I_2$, which is used to index two other values in a look-up table. More particularly, the Values "$v_2$" and "$v_3$" retriever and Storage module 146 is used to look up the values of $v_2$ and $v_3$ from Second Values Table 148, shown in FIG. 1b. Similar to the MSB Table 132, the Second Values Table has a list of index values, $I_{21}$, $I_{22}$, ... $I_{2n}$, which correspond to the second index value $I_2$ discussed above. In contrast to the MSB Table, however the index values correspond to two values that would be used to generate values for $v_2$ and $v_3$. The values generated are Value-$I_{21}$-a, Value-$I_{22}$-a, ..., Value-$I_{2n}$-a; and also correspond to Value-$I_{21}$-b, Value-$I_{22}$-b, ..., Value-$I_{2n}$-b respectively. Thus, the index values are used to retrieve the values of $v_2$ and $v_3$ as set forth in the Second Values Table.

Referring again to FIG. 1a, the Arithmetic unit further includes Fourth Term Generator 150, configured with a fixed point number generator module 152 for generating a value of $v_4$. The fixed point module 152 includes a module 154 configured to identify any remaining fractional values or bits beyond the $k_0$ bits, if any exist. In a preferred embodiment, this module may be configured to simply determine whether any further terms exist that define x, and then retrieve them if they do exist. It may also be configured to retrieve a predetermined number of such secondary values, which may in fact all be zero. A fixed point module 155 is configured to generate a fixed point number representing such values for use in the calculation of $x^y$. Once generated, the fixed point number is inserted with an insert mechanism of the remaining values or bits from module 154, which represents the values or fractional bits that may or may not follow the numbers beyond the $k_0$ bits. The generator 150 finally has a value generator module 158 configured to generate the value $v_4$.

These values are then used in calculation module 108 to generate a result from the equation $x^y=v_1*v_2*\{1+(v_3*v_4)\}$ The memory/storage device where the tables are stored may be a separate device that is external to the processor, or may be configured in a monolithic device, where the memory or storage device is located on the same integrated circuit, such as components connected on a single substrate. The invention is not limited to either type of configuration, let alone any other type of physical configuration, but is expansive and includes circuits and systems that perform the novel methods disclosed herein.

The following example illustrates another embodiment on the invention. The steps given below are generic in the sense they are applicable to any $x^y$, where x is a fixed-point representation of a floating point number. In the discussion, fractional bits refer to bits to the right of the radix point, while integer bits refer to bits to the left of the radix point.

The following are general steps for computing power functions according to one embodiment of the invention.

1. Find the position, denoted N, of the most significant bit in x. This position serves as the index into a table that contains fixed-point representations of $x^{(N\text{-}fractional\_bits)y}$ Denote the retrieved value as $v_1$ and store it for Step 4.

2. Form another index from the $k_o$ bits immediately following the most significant bit. Use this index to address a second table. This second table contains two output values per table entry. One values is $(1+a_1 2^{-1}+a_2 2^{-2}+ \ldots a_{k_0} 2^{-k_o})^y$, while the other is $y/(1+a_1 2^{-1}+ \ldots +a_{k_o} 2^{-k_o})$. Denote these values as $v_2$ and $v_3$ respectively, and store them for Step 4.

3. Create a fixed-point number from remaining bits of x (if any) that directly follow the index from Step 2. Insert these remaining bits into the created number starting at the $k_o$+1 fractional-bit. As such, both the integer-bits and the first $k_o$ fractional-bits of the created number are all zero, while the rest of the created number are the remaining bits of x. Denote this value as $v_4$ and store it for Step 4.

4. Compute the result: $x^y v_1 \times v_2 \times [1+(v_3 \times v_4)]$ using well-known methods of fixed-point arithmetic.

Figure 2:
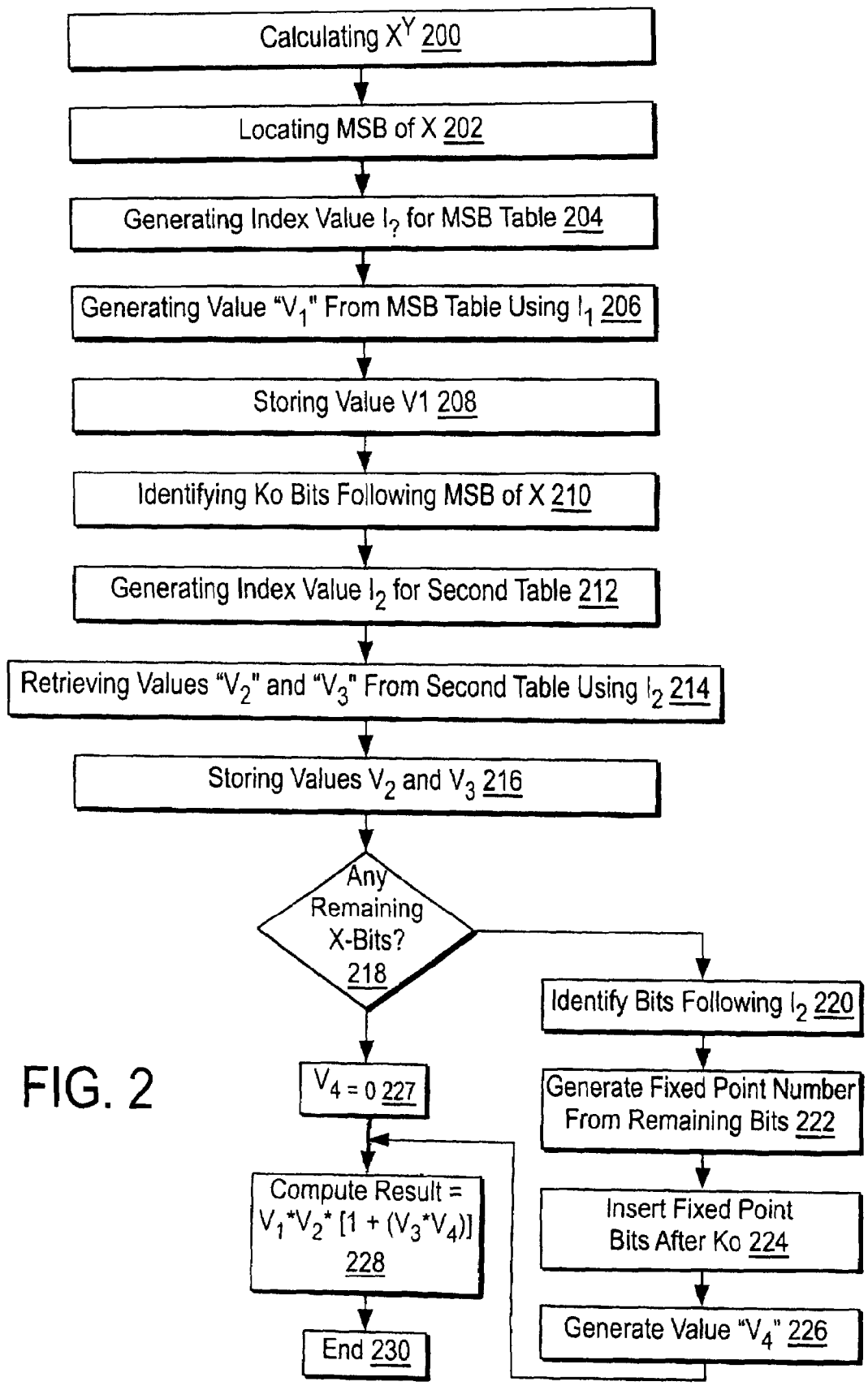
FIG. 2 is a flow diagram illustrating a method according to the invention.

Referring to FIG. 2, a diagrammatic flow chart is shown to illustrate a method configured according to the invention. In step 200, the process for computing the result: $x^y \approx v_1 \times v_2 \times [1+(v_3 \times v_4)]$ is initiated. In step 202, the most significant bit (MSB) of x is located. Then, an index value $I_1$ is generated for use in an MSB table in step 204. In step 206, value of $v_1$ is retrieved from an MSB table using $I_1$. In step 208, the value of $v_1$ is stored. In step 210, a number of bits, $k_0$, that follow the MSB of x is identified. In particular, this can be the $k_0$ bits immediately following the MSB of x. In step 212, a second index value, $I_2$, is generated for use in a second table. In step 214, values of $v_2$ and $v_3$ are retrieved from a second table using $I_2$. In step 216, the values of $v_2$ and $v_3$ are stored. In step 218, a decision is made whether any bits of x remain. If the answer is yes, then the process proceeds to step 220, where any x bits that remain after generating the value of $I_2$ are identified. In step 222, a fixed point number is generated from the remaining bits. In step 224, the fixed point number, or fixed point number bits, are inserted after the position of $k_0$. In step 226, a value of $v_4$ is generated. The result is computed in step 228, where $x^y \approx v_1 \times v_2 \times [1+(v_3 \times v_4)]$ is calculated with the generated values. Referring back to step 218, if no more x bits remain, then $v_4$ is set to zero, $v_4=0$ in step 227, and the result of $x^y \approx v_1 \times v_2 \times [1+(v_3 \times v_4)]$ is calculated accordingly. The process ends at step 230.

Referring to the diagrammatic view of Table 1, a system is shown illustrating one embodiment of the invention below.

depicted in the example. The index in Step 2 is chosen to be 6 bits, which implies that table has 64 entries. Additionally, $v_1$, $v_2$, $v_3$, and $v_4$ are all chosen to be in unsigned 4.16 format, which is seen in the tables and the creation of $v_4$. The computed result in the example correct to 5 digits of precision (all choices discussed impact precision). In a specific example of one embodiment of the invention using real numbers, one implementation of $x^{3/4}$ has a 24-bit input. Two 128 entry tables are used for the second and third terms. The result provides approximately 19 to 20 bits of accuracy using the

TABLE 1

Example approximate: $(2.44140625)^{0.75} = 1.953125$ 2.44140625 = 0b 0010.0111 0001 0000 step 1: position = 13;   step 2;   step 3: $v_4$

| index | $v_1$ |
|---|---|
| 0 | 0x0.0080 |
| 1 | 0x0.00d8 |
| : | : |
| 13 | 0x1.ae8a |
| : | : |
| 15 | 0x4.c1c0 |

| index | $v_2$ | $v_3$ |
|---|---|---|
| 0 | 0x1.0000 | 0x0.c000 |
| 1 | 0x1.02ff | 0x0.bd0c |
| : | : | : |
| 14 | 0x1.28f2 | 0x0.9d8a |
| : | : | : |
| 63 | 0x1.ac04 | 0x0.60c2 |

0b 0000.0000 0000 1000 0000 step 4:

$v_1 * v_2 * \{1 + (v_3 * v_4)\}$
= 0 × 1.ae8a * 0 × 1.28f2 * {0 × 1.0000 + (0 × 0.9d8a * 0 × 0.0080)}
= 0 × 1.f401
= 1.953140 (result which is close to 1.953125)

The illustrated example is specific to $x^{3/4}$ where x is a 16-bit number in unsigned 4.12 format (4 bits to the left of the radix point and 12 fractional bits). The 4.12 format of the input implies the table described in Step 1 must have 16 entries. There are additional specific choices made for the example novel method of two table look-up operations, three multiply operations and one add operation.

Referring to the diagrammatic view of Table 2, a system is shown illustrating another embodiment of the invention below.

TABLE 2

Example approximate: $(2.44140625)^{0.75} = 1.953125$ 2.44140625 = 0b 0010.0111 0001 0000 step 1: position = 13;   step 2;   step 3: $v_4$

| index | $v_1$ |
|---|---|
| 0 | 0x0.0080 |
| 1 | 0x0.00d8 |
| : | : |
| 13 | 0x1.ae8a |
| : | : |
| 15 | 0x4.c1c0 |

| index | $v_2$ | $v'_3 = v_2 * v_3$ |
|---|---|---|
| 0 | 0x1.0000 | 0x0.c000 |
| 1 | 0x1.02ff | 0x0.bf42 |
| : | : | : |
| 14 | 0x1.28f2 | 0x0.b6bc |
| : | : | : |
| 63 | 0x1.ac04 | 0x0.a1c6 |

0b 0000.0000 0000 1000 0000 step 4:

$v_1 \{ v_2 + (v'_3 * v_4) \}$
= 0 × 1.ae8a * {0 × 1.28f2 + 0 × 0.b6bc*0 × 0.0080
= 0 × 1.f400
= 1.953125 (result which is, in this case, equal to 1.953125)

In this embodiment the process for computing the result is re-arranged and the lookup tables are adjusted accordingly. The result is computed as $x^y = v_1 \times [v_2 + (v'_3 \times v_4)]$. The function of $v'_3 = v_2 \times v_3$, gives a distributed multiplication of $v_2$, where the operation is simply a term that is retrieved from a look-up to a table. More specifically, values $v_1$, $v_2$, and $v_4$ are identical to the previous embodiment; however, the table for $v_3$ has been changed to $v_2 \times v_3$, which is pre-computed and stored, and is denoted $v'_3$. Like the other embodiment discussed above, this novel method reduces storage space and computation resources needed to perform complicated arithmetic operations. This is done by reducing predetermined computations to look-up tables, then retrieving the results to perform a complex mathematic problem in a streamlined manner. The invention provides such a method to process a fixed point approximation in a more efficient manner.

In general, the invention may be utilized in any type of processor, such as dedicated processors, internal and external devices related to digital signal processing, and related devices. The processor may be used to control devices such as webservers configured to receive and route browser requests, application servers, state servers and other types of computer processors configured to communicate amongst each other and that may be connected to one or more networks, including a Local Area Network (LAN), an intranet and the Internet. However, it will be appreciated by those skilled in the art, implementation of such devices and systems are but few illustrations of the utility of the invention, and that the invention may have greater applicability and utility in many other applications where mathematical processing is involved. Equivalent structures embodying the invention could be configured for such applications without diverting from the spirit and scope of the invention. Although this embodiment is described and illustrated in the context of devices and systems for computing mathematical formulae within a digital signal processor, computer system or network, the invention extends to other applications where similar features are useful. The invention may be utilized in personal computers, application servers, state servers or Internet webservers that are designed and implemented on a computer and may be connected to a network for communication with other computers to practice the invention. A system configured to operate according to the invention may include a plurality of personal computers connected to the Internet via individual modems or other communication means such as wireless communications.

The invention may also involve a number of functions to be performed by a computer processor, such as a microprocessor. The microprocessor may be a specialized or dedicated microprocessor that is configured to perform particular tasks by executing machine-readable software code that defines the particular tasks. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of computers, such as computer servers, that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, or any commonly used protocol for storing and retrieving information to and from these memory devices respectively.

The apparatus and method include a system and method for computing power functions in the arithmetic unit of a microprocessor. Although this embodiment is described and illustrated in the context of an application for computing $x^y$, the scope of the invention extends to other applications where the operation of componentizing of computations and predetermined values used to generated results are useful. Furthermore, while the foregoing description has been with reference to particular embodiments of the invention, it will be appreciated that these are only illustrative of the invention and that changes may be made to those embodiments without departing from the principles of the invention.

The invention claimed is:

1. A method of generating a fixed point approximation, comprising:

determining a value, denoted N, of the most significant bit in x to serve as an index into a table that contains fixed-point representations of $x^{(N\text{-}fractional\_bits)y}$, wherein the retrieved value is denoted as $v_1$, and storing the value in a computer readable medium;

forming another index, denoted M, from the $k_o$ bits immediately following the most significant bit, wherein M is used as an index to address a second table that contains two output values per table entry:

$$v_2 = (1 + a_1 2^{-1} + a_2 2^{-2} + \ldots + a_{k_o} 2^{-k_o})^y;$$

and $$v_3 = y/(1 + a_1 2^{-1} + \ldots + a_{k_o} 2^{-k_o});$$

and storing the two values;

creating a fixed-point number from remaining bits of x if any exist that directly follow the index M;

inserting these remaining bits into the created number starting at the $k_o + 1$ fractional-bit to get a result, wherein both the integer-bits and the first $k_o$ fractional-bits of the result are all zero, and wherein the remaining bits of the result are the remaining bits of x to generate a second result $v_4$, and storing the second result;

computing the final result: $x^y \approx v_1 \times v_2 \times [1 + (v_3 \times v_4)]$ using fixed-point arithmetic to generate said fixed point approximation used by an electronic device.

2. A method according to claim 1, wherein the value of M is calculated based on bits immediately following the most significant bit.

3. A system configured to generate a fixed point approximation comprising:
- a processor configured to execute code to determine the most significant bit of a number and to generate an index value based on the value of most significant bit;
- a first lookup table configured to store data values of fixed-point representations of $x^{(N\text{-}fractional\_bits)y}$, wherein the processor is further configured to retrieve a value based on the index value to retrieve a first term, denoted as $v_1$;
- a second lookup table configured to store coefficient values, wherein the processor is configured to generate a second term based on bits following the most significant bit and the $(1+a_1 2^{-1}+a_2 2^{-2}+\ldots+a_{k_o} 2^{-k_o})^y$ values are stored in the second lookup table, wherein the table has an additional output, $y/(1+a_1 2^{-1}+\ldots+a_{k_o} 2^{-k_o})$, used for the third term;
- wherein the processor is further configured to retrieve the third term, multiplying the third term with the remaining bits of the input and adding 1 to the result to generate an intermediate term; and wherein the processor is further configured to multiply the first, second and intermediate terms together to generate a fixed point approximation used by an electronic device.

4. An electronic method of generating a fixed point approximation of a number x using a data processor device, comprising:
- locating the most significant bit of x;
- generating a first index value associated with the most significant bit of x;
- retrieving a value from a table that contains fixed-point-representation $v_1$;
- storing the value $v_1$;
- generating a second index from a number of bits, $k_o$ bits, immediately following the most significant bit;
- addressing a second table to retrieve two output values corresponding to the second index value;
- storing the two output values as $v_2$ and $v_3$;
- creating a fixed-point number from remaining bits of x if any exist that directly follow the $k_o$ bits;
- inserting these remaining bits into the created number starting at the $k_o+1$ fractional-bit to get a result, wherein the remaining bits of the result are the remaining bits of x to generate a second result $v_4$;
- storing the second result $v_4$;
- computing the final result: $x^y \approx v_1 \times v_2 \times [1+(v_3 \times v_4)]$ using fixed-point arithmetic to generate a fixed point approximation used by an electronic device.

5. A method according to claim 4, wherein the values of $v_2$ and $v_3$ are $$v_2=(1+a_1 2^{-1}+a_2 2^{-2}+\ldots+a_{k_o} 2^{-k_o})^y;$$

and $$v_3=y/(1+a_1 2^{-1}+\ldots+a_{k_o} 2^{-k_o});$$

respectively.

6. An electronic method of generating a fixed point approximation of a number x with an electronic data processor, comprising:
- locating the most significant bit of x;
- retrieving a first value from electronic data storage, where the first value is based on a first index value generated from the most significant bit and contains fixed-point representation $v_1$ located in a first table in storage;
- retrieving two output values, $v_2$ and $v_3$, corresponding to a second index value generated from a number of bits, $k_o$ bits, immediately following the most significant bit, where the two output values are retrieved from a second table in electronic data storage;
- generating a fourth value $v_4$ corresponding to fractional bits following the $k_o$ bits;
- computing the final result: $x^y \approx v_1 \times v_2 \times [1+(v_3 \times v_4)]$ using fixed-point arithmetic logic to generate a fixed point approximation used by an electronic device.

7. A method according to claim 6, further comprising:
- creating a fixed-point number from remaining bits of x if any exist that directly follow the $k_o$ bits; and
- inserting the fixed point number into the created number starting at the $k_o+1$ fractional-bit to get a result, wherein the remaining bits of the result are the remaining bits of x to generate a second result $v_4$.

8. An electronic method of generating a fixed point approximation of a number x with an electronic data processor, comprising:
- determining a value, denoted N, of the most significant bit in x to serve as an index into a table that contains fixed-point representations of $x^{(N\text{-}fractional\_bits)y}$, wherein the retrieved value is denoted as $v_1$, and storing the value;
- forming another index, denoted M, from the $k_o$ bits immediately following the most significant bit, wherein M is used as an index to address a second table that contains two output values per table entry:

$$v_2=(1+a_1 2^{-1}+a_2 2^{-2}+\ldots+a_{k_o} 2^{-k_o})^y;$$

and $$v_3'=y \times (1+a_1 2^{-1}+a_2 2^{-2}+\ldots+a_{k_o} 2^{-k_o})^y / (1+a_1 2^{-1}+\ldots+a_{k_o} 2^{-k_o});$$

and storing the two values;
- creating a fixed-point number from remaining bits of x if any exist that directly follow the index M;
- inserting these remaining bits into the created number starting at the $k_o+1$ fractional-bit to get a result, wherein both the integer-bits and the first $k_o$ fractional-bits of the result are all zero, and wherein the remaining bits of the result are the remaining bits of x to generate a second result $v_4$, and storing the second result;
- computing the final result: $x^y \approx v_1 \times [v_2+(v'_3 \times v_4)]$ using fixed-point arithmetic to generate a fixed point approximation used by an electronic device.

9. A method according to claim 8, wherein the value of M is calculated based on bits immediately following the most significant bit.

10. A system configured to generate a fixed point approximation comprising:
- a processor configured to execute code to determine the most significant bit of a number and to generate an index value based on the value of most significant bit;
- a first lookup table configured to store data values of fixed-point representations of $x^{(N\text{-}fractional\_bits)y}$, wherein the processor is further configured to retrieve a value based on the index value to retrieve a first term;
- a second lookup table configured to store coefficient values, wherein the processor is configured to generate a second term based on bits following the most significant bit and the $(1+a_1 2^{-1}+a_2 2^{-2}+\ldots+a_{k_o} 2^{-k_o})^y$ values are stored in the second lookup table, wherein the table has an additional output, $y \times (1+a_1 2^{-1}+a_2 2^{-2}+\ldots+a_{k_o} 2^{-k_o})^y / (1+a_1 2^{-1}+\ldots+a_{k_o} 2^{-k_o})$, used for the third term;

wherein the processor is further configured to retrieve the third term, multiplying the third term with the remaining bits of the input and adding 1 to the result to generate an intermediate term; and wherein the processor is further configured to multiply the first, second and intermediate terms together to generate a fixed point approximation used by an electronic device.

11. An electronic method of generating a fixed point approximation, comprising:
locating the most significant bit of x;
generating a first index value associated with the most significant bit of x;
retrieving a value from a table that contains fixed-point representation $v_1$;
storing the value $v_1$;
generating a second index from a number of bits, $k_o$ bits, immediately following the most significant bit;
addressing a second table to retrieve two output values corresponding to the second index value;
storing the two output values as $v_2$ and $v'_3$;
creating a fixed-point number from remaining bits of x if any exist that directly follow the $k_o$ bits;
inserting these remaining bits into the created number starting at the $k_o+1$ fractional-bit to get a result, wherein the remaining bits of the result are the remaining bits of x to generate a second result $v_4$;
storing the second result $v_4$;
computing the final result: $x^y \approx v_1 \times [v_2+(v'_3 \times v_4)]$ using fixed-point arithmetic to generate a fixed point approximation used by an electronic device.

12. A method according to claim 11, wherein the values of $v_2$ and $v'_3$ are $$v_2=(1+a_1 2^{-1}+a_2 2^{-2}+\ldots+a_{k_o} 2^{-k_o})^y;$$

and $$v'_3=y \times (1+a_1 2^{-1}+a_2 2^{-2}+\ldots+a_{k_o} 2^{-k_o})^y / (1+a_1 2^{-1}+\ldots+a_{k_o} 2^{-k_o});$$

respectively.

13. A electronic method of generating a fixed point approximation of a number x with a data processor, comprising:
locating the most significant bit of x;
retrieving a first value from electronic data storage, where the first value is based on a first index value generated from the most significant bit and contains fixed-point representation $v_1$ located in a table in storage;
retrieving two output values, $v_2$ and $v'_3$, corresponding to a second index value generated from a number of bits, $k_o$ bits, immediately following the most significant bit, where the two output values are retrieved from a table in electronic data storage;
generating a fourth value $v_4$ corresponding to fractional bits following the $k_o$ bits; and
computing the final result: $x^y \approx v_1 \times [v_2+(v_3 \times v_4)]$ using fixed-point arithmetic to generate a fixed point approximation used by an electronic device.

14. A method according to claim 13, further comprising:
creating a fixed-point number from remaining bits of x if any exist that directly follow the $k_o$ bits; and
inserting the fixed point number into the created number starting at the $k_o+1$ fractional-bit to get a result, wherein the remaining bits of the result are the remaining bits of x to generate a second result $v_4$.

* * * * *